United States Patent [19]
Porth et al.

[11] Patent Number: 4,770,036
[45] Date of Patent: Sep. 13, 1988

[54] APPARATUS FOR MEASURING VELOCITY OF FLOW

[75] Inventors: Wolfgang Porth, Frankfurt am Main; Wolfgang Weibler, Hofheim a. T., both of Fed. Rep. of Germany

[73] Assignee: VDO Adolf Schindling AG, Frankfurt am Main, Fed. Rep. of Germany

[21] Appl. No.: 21,297

[22] Filed: Mar. 3, 1987

[30] Foreign Application Priority Data

Mar. 3, 1986 [DE] Fed. Rep. of Germany ....... 3606850

[51] Int. Cl.⁴ ............................................... G01F 1/68
[52] U.S. Cl. ..................................... 73/204; 73/118.2; 338/25
[58] Field of Search ................. 73/204, 118.2; 338/25, 338/308, 309

[56] References Cited

U.S. PATENT DOCUMENTS

| 4,471,647 | 9/1984 | Jerman et al. | 338/25 |
| 4,498,337 | 2/1985 | Gruner | 73/204 |
| 4,554,829 | 11/1985 | Sumal | 73/204 |
| 4,680,963 | 7/1987 | Tabata et al. | 73/204 |
| 4,696,188 | 9/1987 | Higashi | 73/204 |

Primary Examiner—Herbert Goldstein
Attorney, Agent, or Firm—Martin A. Farber

[57] ABSTRACT

In an arrangement for measuring the velocity of flow of fluids, and, in particular, of the intake air of internal combustion engines, having an electrically heatable resistance layer which is applied in insulated manner on a support and is in thermal contact with the flowing fluid, the support consists of silicon. Between the support and the resistance layer an electrically insulating layer is applied. The resistance layer consists preferably of suitably doped polycrystalline silicon.

9 Claims, 1 Drawing Sheet

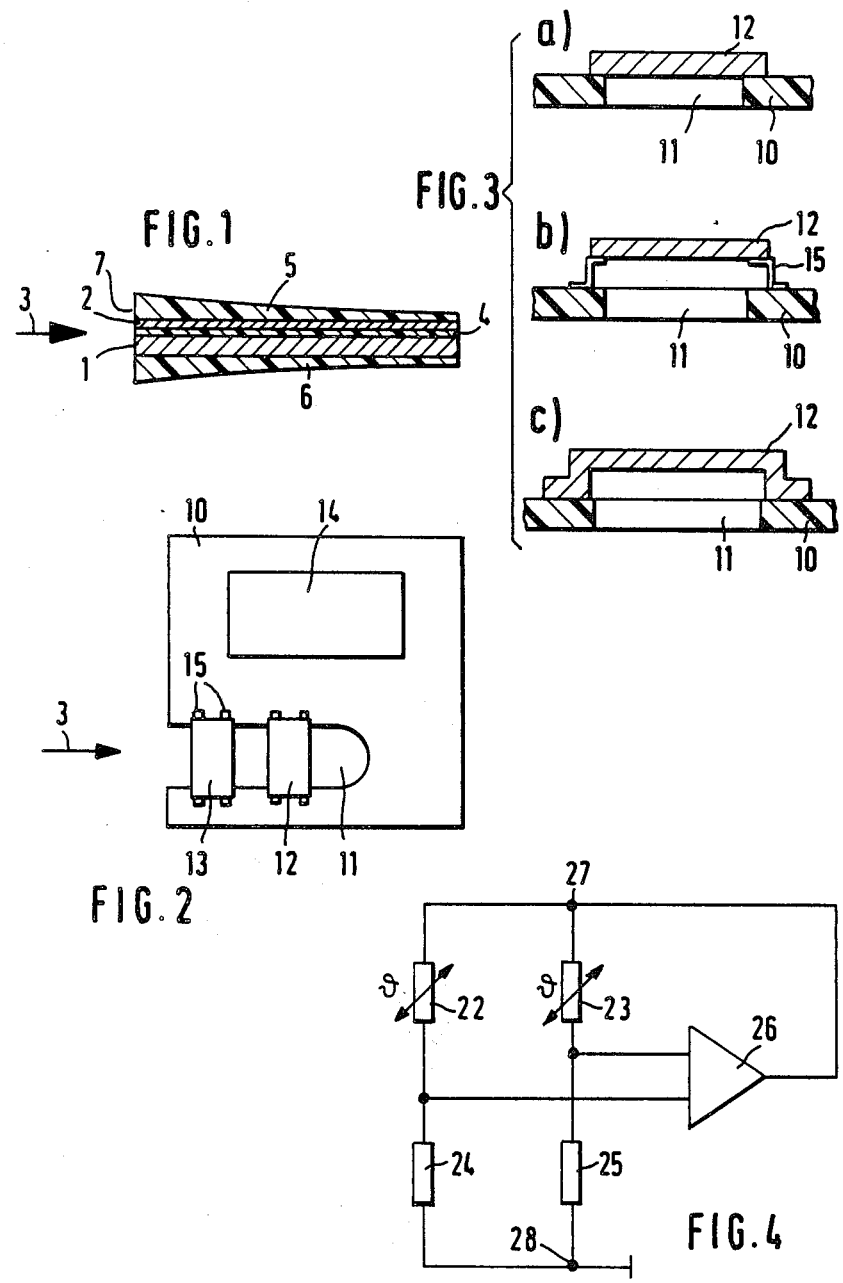

APPARATUS FOR MEASURING VELOCITY OF FLOW

FIELD AND BACKGROUND OF THE INVENTION

The present invention relates to an arrangement for measuring the velocity of flow of fluids, particularly the intake air of internal-combustion engines, having an electrically heatable resistance layer which is applied in insulated fashion on a support and is in heat contact with the flowing fluid.

Such arrangements are required mainly as air-mass meters in internal-combustion engines of automotive vehicles so that the combustion process can be controlled, with due consideration of the mass of air drawn in, in order to minimize injurious substances, In the known arrangements, the support consists of ceramic, which has the disadvantage that it is difficult to machine subsequently.

SUMMARY OF THE INVENTION

It is an object of the invention to provide an improved arrangement of the introductory-mentioned type.

According to the invention the support consists of silicon and has various advantages over the known arrangements. Among other things, it is characterized by good thermal conductivity so that a good flow of heat to the flowing fluid is assured for both sides of the resistance layer. The high temperature conductivity of silicon leads to a rapid equalization of temperature within the support and thus to a short response time. Furthermore, silicon is easy to passivate, i.e. to provide with a non-conductive layer, and it can be machined by standard processes which have proven their work in semiconductor technology.

As compared with foils which are also known as support material, silicon has the advantage that it is dimensionally stable.

In accordance with a further development of the invention, an electrically insulating layer is applied between the support and the resistance layer. This can be done by nitriding or oxidizing of the surface of the support. However, it is possible, within the scope of another further development of the invention, to produce the electrically insulating layer by vapor-deposition of glass.

Another development of the invention resides in the fact that the resistance layer consists of suitably doped polycrystalline silicon.

In accordance with another development of the invention, further layers of low thermal conductivity are provided on the resistance layer and on the surface of the support facing away from the resistance layer, and these further layers have a thickness which decreases in the direction of flow. In this way, a constant local heat transfer coefficient is obtained so that upon the operation of the arrangement of the invention no temperature gradient results in the direction of flow within the resistance layer. This contributes substantially to less inertia of the measurement.

In accordance with other further developments, additional resistors and/or a monolithic circuit can be applied to the support. In this way, there is created a compact arrangement from which the result of the measurement can be obtained as a corresponding electric signal.

Further according to the invention the electrically insulating layer can be applied by nitriding or oxidizing.

Still further, the electrically insulating layer can be applied by the vapor deposition of glass.

BRIEF DESCRIPTION OF THE DRAWINGS

With the above and other objects and advantages in view, the present invention will become more clearly understood in connection with the detailed description of preferred embodiments, when considered with the accompanying drawing, of which:

FIG. 1 is an enlarged cross section shown through an arrangement in accordance with the invention;

FIG. 2 is a view of an air-mass sensor having an arrangement in accordance with the invention;

FIGS. 3a–3c show examples of the mounting of an arrangement according to the invention on a printed circuit board, and FIG. 4 is a wiring diagram for an air-mass sensor having an arrangement in accordance with the invention.

Identical parts have been provided with the same reference numbers in the figures.

DETAILED DESCRIPTION OF THE PREFERRED EMBODIMENTS

In the sectional view shown in FIG. 1, 1 is the silicon support. In order to obtain the greatest possible sensitivity, heat is to be withdrawn from both sides of the resistance layer by the stream of air 3 which is diagrammatically indicated in the form of an arrow. The support 1 is therefore as thin as possible with due consideration to its mechanical stability. Due to the good thermal conductivity of silicon, the giving off of heat from the resistance layer 2 via the support 1 to the stream of air is also favored.

For the support 1, silicon which does not have the high degree of purity required for electronic components can in itself be used. However, it is definitely possible, within the scope of the invention, to develop on the support 1 aside from the resistance layer 2 also other resistors and possibly, by means of a monolithic technique, also the corresponding electric circuits. Suitably pure silicon is, however, required for this.

In order to insulate the support from the resistance layer 2 there is employed a passivation 4 which can be produced, for instance, by nitriding, oxidizing or coating with glass.

For the production of the resistance layer 2, a layer of highly pure polysilicon is applied on the passivation 4, said layer having the required electric properties as a result of processes known in the semiconductor art, only a few of the steps of which will be mentioned below. After recrystallization by means of the light of a laser or of an argon high-pressure lamp, ion implantation takes place so that the temperature coefficient of the resistance layer can be fixed within wide limits. Higher temperature coefficients are possible here than in the case of metallic resistance layers, so that greater sensitivity and possibly a simpler electric circuit are possible. The temperature coefficient may, however, be selected even lower than is technically possible in order to adapt oneself to the specific case of use.

This is followed by a temperature treatment in order to heal the crystal, as well as by several steps for producing the required structure and finally by the contacting. The structure can, for instance, consist therein that the resistance layer 2 forms a conductive path extending in meander shape.

After the production of the resistance layer 2, a protective layer is applied to the resistance layer 2 and to the facing surface of the support 1, said protective layer protecting the arrangement from, in particular, chemical effects of the fluid to be measured.

In accordance with a further development of the invention, the protective layers 5, 6 are applied in such a manner that the local heat transfer coefficient between the flowing fluid and the resistance layer 2—as seen in the direction of flow—is at least approximately constant. Without this measure the local heat transfer coefficient is namely greatest in the vicinity of the edge 7 which faces the flow of air and decreases with increasing distance from said edge. In this way a temperature gradient in the direction of flow within the resistance layer, said gradient being dependent on the velocity of flow and causing a relatively long response time of the known sensors. Due to the decrease in thickness of the layers 5 and 6 in the direction of flow, this effect is compensated for so that the response time is reduced.

FIG. 2 shows an arrangement for measuring the velocity of flow such as can be installed, for instance, into the intake passageway of an internal combustion engine for measurement of the air mass. Here, a printed circuit board 10 is provided with a cutout 11 which opens in the direction opposite the direction of flow 3 of the air and permits the actual sensor 12, which can be constructed in accordance with FIG. 1, and a temperature sensor 13 to be flown over on both sides. The arrangement of the sensor 12 and of the temperature sensor 13, for instance with the use of spacers 15, will be explained in further detail in connection with FIG. 3. Furthermore, an electric circuit 14 is provided on the circuit board.

The circuit board 10 can consist, in known manner, of plastic, for instance fiber-reinforced epoxy resin and can bear corresponding conductive paths on which, in their turn, the elements 12, 13 and 14 are soldered in traditional fashion. In this connection, the electrical circuit can comprise both discrete components and integrated circuits or be combined in an integrated circuit.

The circuit board 10 can, however, also be developed as support for a hybrid circuit and consist of ceramic or glass. A passivated metal plate is also suitable to receive the sensors 12 and 13 as well as the electric circuit 14.

FIG. 3 shows various possibilities of arranging the sensor 12 and the temperature sensor 13 on the circuit board 10. In the showing of FIG. 3a the sensor 12 and temperature-sensor 13 are soldered or welded directly on the circuit board 10, for which purpose various methods are available (for instance spot welding, laser welding, ultrasonic welding). In accordance with FIG. 3b, spacers 15 are provided which can at the same time represent the conductive connections to the conductive paths (not shown) on the circuit board 10. Finally it is indicated in FIG. 3c that the sensor 12 and the support 1 (FIG. 1) of the sensor are so shaped that edges are produced on the sides thereof, the edges resulting in a spacing between the support and the circuit board 10. In FIGS. 3a to 3c contacts, which are necessary in each case, have not been shown. Methods for this are, however, sufficiently well known.

FIG. 4 shows a circuit arrangement which can be used within the scope of the invention. In this case, the resistor 22 of the sensor 12, the resistor 23 of the temperature sensor 13 (FIG. 2) as well as two additional resistors 24 and 25 form a bridge circuit. The junction points of the resistors 22 and 24, on the one hand, as well as of the resistors 23 and 25, on the other hand, are connected to the inputs of a difference amplifier 26 whose output is connected to the circuit point 27 for the feeding of the bridge while the other end 28 of the bridge circuit is connected to ground potential. The resistors 22 and 23 are temperature-dependent. The branch of the bridge formed by the resistors 22 and 24 has such a low resistance that heating of the resistor 22 is produced by the flow of current. The branch of the bridge formed of the resistors 23 and 25 is, on the other hand, of high ohmic resistance and practically no heating thus takes place with respect to the surroundings. This branch of the bridge serves thus for detecting the temperature of the flowing air.

The control circuit formed by the bridge circuit and the difference amplifier 26 is now designed in such a manner that the excess temperature of the resistor 22 caused by the heating of the resistor 22 as compared with the surrounding air is maintained constant. The faster the flow of air, the more heat is removed, for which purpose once again more current is necessary in order to heat the resistor 22. The current through the resistor 22 is thus a measure of the velocity of flow of the air and, when the cross section of the flow is known, a measure of the mass of air per unit of time. In order to increase the sensitivity of response, the resistors 24 and 25 can be provided with temperature coefficients opposite those of the resistors 22 and 23.

We claim:

1. In an apparatus for measuring the velocity of flow of fluids, particularly intake air of internal combustion engines, the apparatus having a support, and an electrically heatable resistance layer which is applied in insulated fashion on the support, the resistance layer being in thermal contact with the flowing fluid, the improvement wherein
the support is made of silicon; the apparatus further comprising
further layers of low thermal conductivity provided on the resistance layer and on the surface of the support facing away from the resistance layer; and wherein
said further layers have a thickness which decreases in the direction of flow.

2. The apparatus according to claim 1, further comprising
an electrically insulating layer applied between the support and the resistance layer.

3. The apparatus according to claim 2, wherein
the resistance layer is made of doped polycrystalline silicon.

4. The apparatus according to claim 2, further comprising
additional resistors applied to the support.

5. The apparatus according to claim 4, further comprising
a monolithic circuit applied to the support.

6. The apparatus according to claim 4, wherein
the electrically insulating layer comprises a nitride applied by nitriding.

7. The apparatus according to claim 4, wherein
the electrically insulating layer comprises an oxide applied by oxidizing.

8. The apparatus according to claim 2, wherein the electrically insulating layer comprises glass applied by vapor deposition of glass.

9. In an apparatus for measuring the velocity of flow of fluids, particularly intake air of internal-combustion engines, the apparatus having a support and an electrically heatable resistance layer which is applied in insulated fashion on the support, the resistance layer being in thermal contact with the flowing fluid, the improvement wherein
the support is made of silicon; the apparatus further comprising
an electrically insulating layer applied between the support and the resistance layer; and
further layers of low thermal conductivity provided on the resistance layer and on the surface of the support facing away from the resistance layer, and wherein
said further layers have a thickness which decreases in the direction of flow.

* * * * *